United States Patent [19]

Mattern

[11] 4,051,328

[45] Sept. 27, 1977

[54] METHOD FOR OPERATING A DIGITAL TIME DIVISION MULTIPLEX COMMUNICATION NETWORK

[75] Inventor: Alfred Mattern, Grobenzell, Germany

[73] Assignee: Siemens Aktiengesellschaft, Munich, Germany

[21] Appl. No.: 601,987

[22] Filed: Aug. 5, 1975

[30] Foreign Application Priority Data

Aug. 8, 1974 Germany .......................... 2438199

[51] Int. Cl.² ............................................... H04J 3/00
[52] U.S. Cl. .................................................. 179/15 AL
[58] Field of Search ........ 179/15 AL, 15 BA, 15 BV, 179/15 BY; 340/172.5; 178/50

[56] References Cited

U.S. PATENT DOCUMENTS

| 3,529,089 | 9/1970 | Davis | 179/15 AL |
|---|---|---|---|
| 3,597,549 | 8/1971 | Farmer | 179/15 AL |
| 3,603,739 | 9/1971 | Edson | 179/15 AL |
| 3,633,164 | 1/1972 | Hynes | 178/50 |
| 3,633,166 | 1/1972 | Picard | 179/15 AL |
| 3,742,148 | 6/1973 | Ledeen | 179/15 AL |
| 3,751,595 | 8/1973 | Moses | 179/15 AL |

FOREIGN PATENT DOCUMENTS

2,015,511  1/1971  Germany .......................... 178/50

*Primary Examiner*—David L. Stewart
*Attorney, Agent, or Firm*—Schuyler, Birch, Swindler, McKie & Beckett

[57] ABSTRACT

A digital time division multiplex communication network wherein the subscriber terminals are disposed in a fixed order on a TDM trunk going out from and ending in the terminal exchange is described. The data intended for the subscriber terminals are sent out by the terminal exchange together with an unmodulated carrier byte in the order of the connection of the subscriber terminals. After receiving the information intended therefor and after modulation of the carrier byte with the information to be supplied, the subscriber terminals are no longer capable of reception until the next pulse frame. The carrier bytes sent which are transmitted further and now modulated pass without hindrance through succeeding subscriber terminals.

12 Claims, 7 Drawing Figures

FIG. 6 uc = unblocking code word
lc = leading code word
ib = information byte
cb = carrier byte A — Receiver in subscriber station is replaced B — Subscriber terminal sends reduced leading code without communication information C — EVSt causes emission of leading code + address code of relevant subscriber terminal in the time position heretofore used for data transmission D — Upon reception of these bytes subscriber terminal is deactivated

FIG. 7

METHOD FOR OPERATING A DIGITAL TIME DIVISION MULTIPLEX COMMUNICATION NETWORK

BACKGROUND OF THE INVENTION

The invention relates to a method for operating a digital time division multiplex (TDM) communication network, wherein subscriber terminals are connected to a central TDM trunk in a prespecified order.

A communication network in which subscriber terminals are connected in this fashion is particularly suitable if one uses a TDM trunk having a broadband transmission capacity, e.g., in the form of a glass fiber circuit, over which laser beams are transmitted as data carriers.

In a prior art communication network of this type (cf. West German Offenlegungsschrift No. 1,804,624), the basic form of the switching network comprises a number of subscriber terminals connected in a specific order to a directed transmission line which, for example, is ring-shaped. The switching in such a switching network takes place such that the subscriber terminals use a transmitted transfer address to extract the part intended for them of the total message flow routed to each subscriber (cf. NTZ Report 14, 1972, pp. 23-26). When such switching networks assume fairly large proportions and several such interconnected ring circuits are produced which are in communication with one another at a network node, or several network branches are provided that go out from network nodes (cf. NTZ Report 17, 1973, page 8), storages are available as central devices that are disposed in the network nodes only, by which one prevents message blocks entering the nodes from various directions from being unduly superimposed one another.

Certainly, the shifting of the essential switching functions to the subscriber terminals entails great expense.

Hence, in the case of a TDM communication network having a transmission circuit with broadband transmission capacity, it has been proposed to depart in the terminal area from the far-reaching decentralization of the exchange as taught in the prior art solution and to provide a central terminal exchange where, as in the prior art solution, the operation takes place with the aid of subscriber addresses transferred over the TDM trunk. According to this proposal, the communication data to be transmitted are supplied from the subscriber terminals as a result of reception of the special address transmitted from the terminal exchange in the time slot assigned to the connection in question, whereby the subscriber terminals modulate the unmodulated byte received immediately after its address in accordance with the communication data provided by them, and transfer the same in the direction of transmission.

Thus, one can in this way reduce the number of subscriber-specific devices, and synchronization problems occurring during the switching process can fully be avoided.

It is inherent that the transfer of addresses during the switching process and the maintenance of the connection in the manner indicated above require a comparatively large portion of the transmission band available for each connection. This does not have a deleterious effect, provided broadband transmission circuits are used, for example, glass fiber circuits, and as long as only telephone data shall be transmitted in such a communication network.

Particularly in view of the desire to transfer in the future types of data other than telephone data (e.g., radio data, television data in connection with video telephony, and data in communication networks), it is an object of this invention to provide a method for operating communication networks which, as far as operational reliability is concerned, at least nearly produces the same favorable results as the above teaching with respect to the full utilization of the transmission capacity of the transmission circuit, but which is only slightly less propitious than known TDM methods in which no addresses are transferred over the TDM trunk.

In accordance with the invention, the foregoing and other objects are achieved in that in a method of the type mentioned above one transmits from a central terminal exchange the communication data for the subscriber terminals participating in calls in the order of their connection to the TDM trunk. The subscriber terminals made ready for receiving such data at the start of each sampling pulse frame, yet continually blocked for the reception of communication data sent by other subscriber terminals, are disabled after receiving for the first time and supplying the communication data to be transmitted further by them for the reception of other communication data going out from the exchange. In this state the subscriber terminals allow the communication data to pass.

Thus, in known TDM methods either the allotted time slot or subscriber addresses continually accompany the communication data to enable the differentiation of the communication data pertaining to various connections. In contrast, in accordance with the invention, one uses as differentiating criteria the order in which the subscriber stations are connected to the TDM trunk or the corresponding order of the communication data intended for them.

Admittedly, a digital multiplexer arrangement has been known for transmitting digital signals between a main station and a plurality of substations (West German Auslegeschrift No. 2,015,511), wherein the substations are connected together over a single circuit. This system is so operated that the substations receive data successively from the main station and return data in the opposite direction to the main station, after which they allow further data sent out from the main station or further data returned from other substations to pass without hindrance. An exchange, however, is not provided is this known arrangement, since all the existing substations are continually involved in the connection with the main station, even though interleaved in time. Because of the type of information supplied by the individual substations, particularly in the opposite direction toward the main station, one cannot achieve the required continuity of the bit flow over the TDM trunk even if the operating mode of the known multiplexer arrangement is applied to a switching system. This is due to the different transit times between the subscriber terminals and the terminal exchanges.

A further development of the invention defines a manner in which one can establish and release a connection in a pulse code modulated/time division multiplex (PCM/TDM) switching system, how the control processes required in the subscriber terminals can conveniently be performed in connection with the preparation of the terminals for accepting communication data and the blocking or preparation for the free passage of communication data not intended therefor. It also provides a way by which different subscriber terminals can be connected to the common TDM trunks which are intended for the acceptance and output of various types of information.

BRIEF DESCRIPTION OF THE DRAWINGS

The principles of the invention will be more readily understood by reference to the description of a preferred embodiment of apparatus constructed to execute the method of the invention given hereinbelow in conjunction with the drawings which are briefly described below.

DETAILED DESCRIPTION OF THE DRAWINGS

Figure 1:
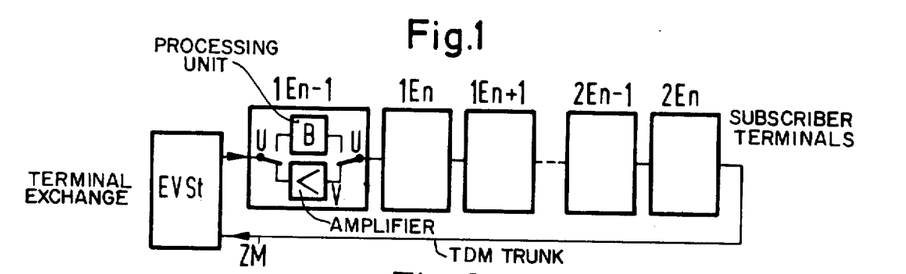
FIG. 1 is a block schematic diagram of a TDM trunk of a PCM/TDM communication network in the area of a terminal exchange with subscriber terminals connected thereto.

FIG. 1 illustrates a terminal exchange EVSt, wherein a ring-shaped TDM trunk ZM exits and enters. Subscriber terminals E are connected to the TDM trunk ZM and are identified by subscripts in the order of their connection. Thus, one subscriber terminal is labelled $1En$ which, viewed in the outgoing direction from the terminal exchange, lies behind the subscriber terminal $1En--1$, but before the subscriber terminal $1En+1$. The prefixed numeral 1 in the reference symbol indicates that the subscriber stations belong to a first catagory, for example, telephone subscriber terminals, whereas the subscriber terminals $2En-1$ and $2En$ are data terminals.

The subscriber terminals mentioned above are connected to the TDM trunk in either of two ways. The first of these is that they only amplify the bytes travelling to their inputs, but otherwise leave them unchanged, in which case they merely act as repeaters. This means that these subscriber terminals are blocked for the reception of bytes sent out by the terminal exchange as well as bytes sent out by preceding subscriber terminals. Alternatively, they are connected to feed data travelling to their inputs to their respective processing units B, in which case they are ready for receiving such data. The last-mentioned operational state, as will be explained further below, can only be achieved in connection with data have been sent from the terminal exchange. The above conditions are shown by means of selector switches U capable of switching between the amplifier V and the processing section B.

If, for example, it is assumed that the three terminals $1En-1$, $1En$ and $1En+1$ are subscriber terminals involved in calls within the time period under consideration then, at the start of every sampling pulse frame for data sent from the terminal exchange, they are prepared by an appropriate unblocking byte. Thus byte has the same effect on all activated subscriber terminals. The transmission of the data intended for the subscriber terminals takes place from the terminal exchange in the order in which the terminals are connected to the TDM trunk. Thus, within each sampling pulse frame the information for the subscriber terminal $1En-1$ is sent first, then the information for the subscriber terminal $1En$ and, finally, the information for the subscriber terminal $1En+1$.

Hence, the information for the subscriber terminal $1En-1$ sent first reaches that subscriber terminal by means of outgoing trunk ZM. This terminal receives the communication data and, in turn, sends a unit of communication information by means of the TDM trunk ZM towards the second subscriber terminal $1En$. The transferred communication information is merely amplified by the following subscriber terminal $1En$ and by all other subscriber terminals. It cannot be received by them as a unit of communication information originating in the terminal exchange, because, as will be explained hereinbelow, it is connected with an appropriate criterion used for accompanying the communication data emitted from subscriber terminals.

The communication data supplied by the subscriber terminal $1En-1$ finally returns over the incoming section of the TDM trunk ZM to the terminal exchange EVSt.

The subscriber terminal $1En-1$ is blocked after receiving the communication data intended for it from the terminal exchange. That is, it cannot receive further communication data transmitted from there during the remainder of the sampling pulse frame. Hence, the next unit of communication information transmitted from the terminal exchange EVSt travels unchanged to the second subscriber terminal $1En$, by which it is received. This subscriber station likewise transmits, as described for the preceding one, its communication data, which pass through all the following subscriber terminals and finally also travel back to the terminal exchange. In corresponding fashion, also the other subscriber terminals receive throughout the duration of the appropriate time frame, corresponding to the order of their connection to the TDM trunk ZM, communication data from the terminal exchange, and they then transfer communication data thereto.

Processes will be detailed hereinbelow (FIG. 2) which take place in the subscriber terminals during the operation of the above-described PCM/TDM communication network. This description will proceed from a variation of the method according to the invention, by which the terminal exchange together with the communication data intended for the subscriber stations transmits a group of unmodulated carrier bits, as well as an identifying code word which identifies the category of subscriber terminals for which the communication data are intended, or which identifies the type of communication data. In this case it is assumed that in the total byte sent out from the terminal exchange the leading code word appears first, that it is followed by unmodulated carrier bits, and that the communication data follow as the last subgroup.

Figure 2:
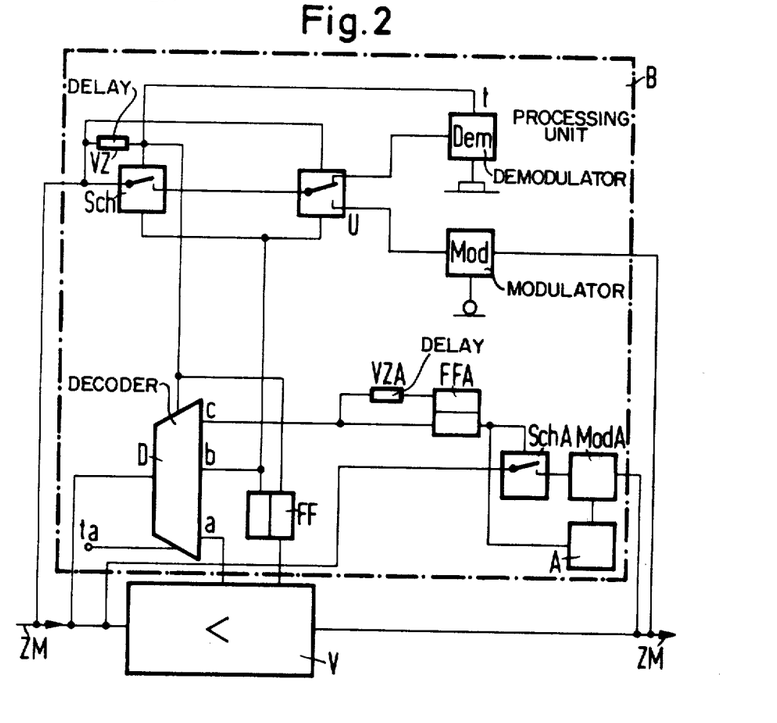
FIG. 2 is a detailed schematic diagram of those parts of a subscriber terminal in the FIG. 1 embodiment necessary for performing the method according to the invention.

Moreover, the description proceeds from an operational state in which at periodic intervals at the start of each sampling pulse frame, an unblocking code word has prepared all subscriber terminals of the category involved in these calls to receive data.

If a total byte of the foregoing description arrives at the first subscriber terminal in the order of its connection to the TDM trunk, responsive to the reception of a first part of the leading code word (e.g., its first three bits) a signal is transmitted by the decoder D of the subscriber terminal from decoder output $a$. This signal leads to the temporary disablement of the amplifier V thereby blocking it from a directly passing over the TDM trunk ZM. Due to the reception of the second part of the leading code word (e.g., its fourth bit), a signal also appears at the output $b$ of the decoder D that sets a bistable circuit FF and, hence, applies a continuous disabling signal to the amplifier V, thus bringing about complete blocking.

The signal transmitted over the output b of the decoder D also works as an enabling signal for the processing section B of the subscriber terminal, in that it is coupled to a switch Sch as an enabling signal, a connection of the processing section B being established with the TDM trunk ZM by the switch. It is also coupled to a selector switch U which, as a result, is placed in a switching position in which it establishes a connection between the switch Sch and the input of the modulator Mod of the processing section B. Viewed from the subscriber terminal under consideration, the output of the modulator Mod is connected to the outgoing section of the TDM trunk ZM.

Hence, the group of unmodulated carrier bits following the leading code word over the incoming section of the TDM trunk can travel over the switches Sch and U to the modulator Mod so as to be modulated there with the communication data to be transmitted from the subscriber terminal. Thereafter, the carrier byte travels as a modulated byte over the outgoing section of the TDM trunk, where it follows the first three bits of the leading code word which, in contrast to its last bit, have not been prevented from passing directly through the amplifier V.

The carrier byte that is unmodulated has also traveled to the delay element VZ, the delay time of which is so adjusted that after the byte passes through the modulator Mod, the first bit of the carrier byte waits to be served at the output of the delay element and, hence, at the timing input $t$ of a demodulator Dem in the processing unit. Thus, the demodulation pulse of the following demodulation process is determined by this first and following bits supplied by the delay element. As a result of a polarity reversal at the end of the undelayed carrier byte supplied over the TDM trunk ZM, the selector switch U, too, had been so influenced at its second changeover input that it now connects the output of the switch Sch to the input of the demodulator Dem. Thus, the communication data supplied over the TDM trunk and which had been sent from the central terminal exchange are now demodulated.

The polarity reversal at the end of the group of unmodulated carrier bits, comprising as many bits as the byte carrying the information, is now also used to block the subscriber terminal in question from receiving further bytes after the end of the total byte. Together with the end of the total byte, there appears at the output of the delay element VZ the shift in potential existing at the end of the unmodulated carrier byte. This change in potential causes the reopening of the switch Sch, the setting of the bistable circuit FF, thereby cancelling out the blocking of amplifier V, and the disablement of the decoder D for the reception of further leading code words. In this way, it is ensured that total bytes comprising leading code word, unmodulated carrier byte and communication data and intended for subscriber terminals that follow in the order of their connection, pass through the subscriber terminal under consideration. As stated, they are only amplified by the amplifier V.

Excluded from the aforementioned blocking of decoder D is only the unblocking code word sent at the start of each sampling pulse frame, which code word triggers a renewed readiness for reception, and an address code word which, as will be explained hereinbelow, plays a role in the setup of calls.

The byte comprising the leading code word leaving the previously discussed subscriber terminal and shortened by one bit and the carrier byte modulated with the communication data to be supplied can pass through all succeeding subscriber terminals, since on that location the three bits of the leading code word first cause a momentary blocking of the amplifier V. However, the blocking is cancelled out immediately in the absence of the fourth bit in the leading code word, and also, the above described enabling processes cannot take place in the processing units concerned. Thus, the total byte is merely amplified and returns finally to the central terminal exchange.

Figure 5:
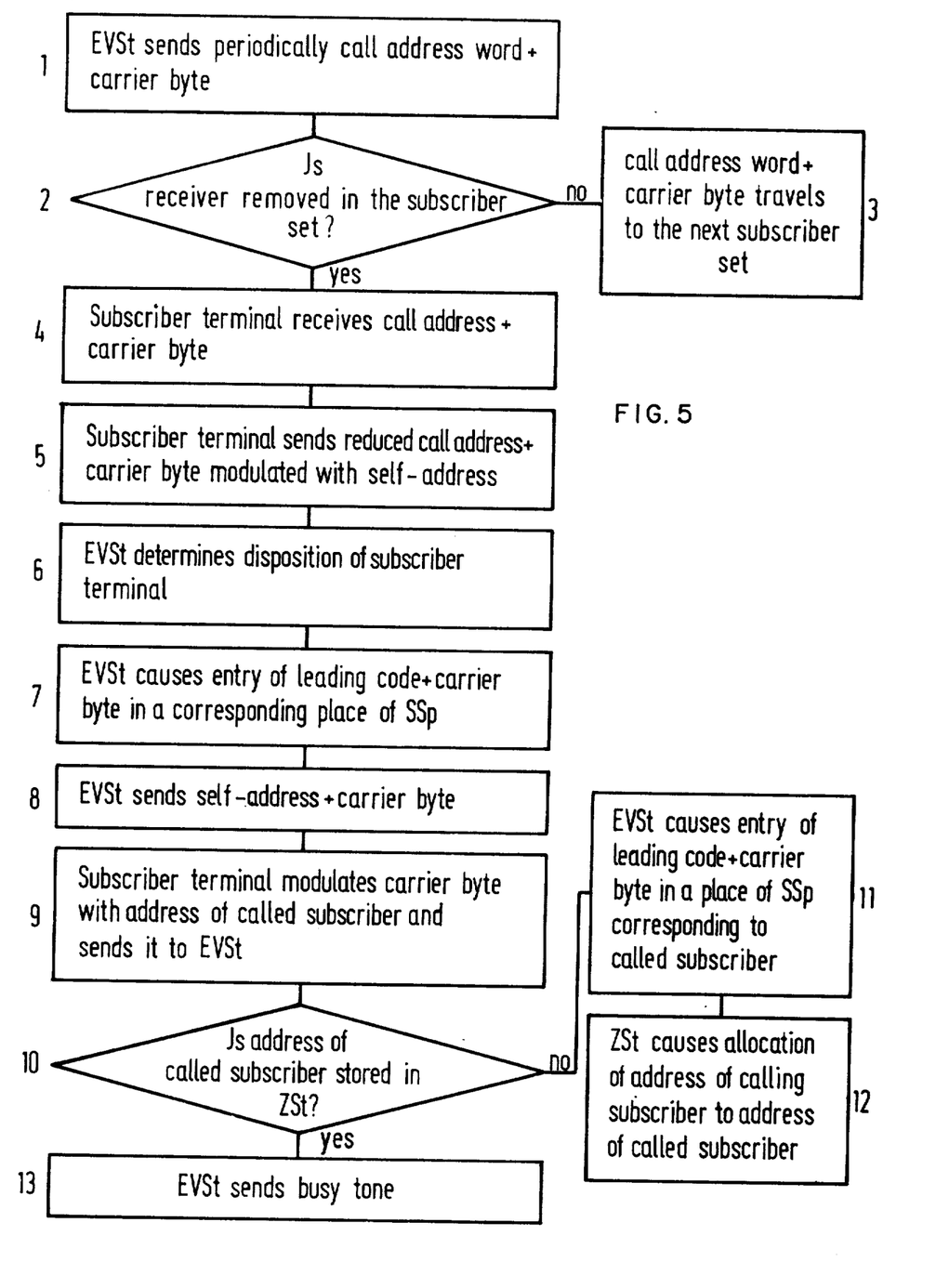
FIG. 5 is a flow diagram illustrating the steps of the process leading to a call setup.
Figure 6:
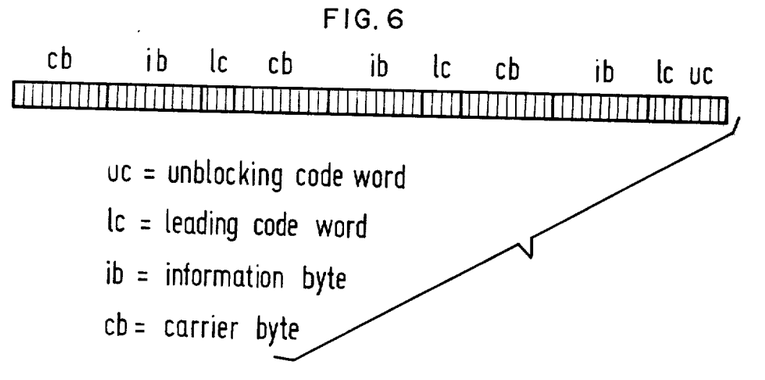
FIG. 6 is a diagram illustrating a typical data frame.

In operating a PCM/TDM communication network according to the invention, a call may be set up in the following manner. From the central terminal exchange call bytes comprising a call address word and a carrier byte are sent at regular intervals in time slots. Subscriber terminals in which, for example, by removing the receiver in the subscriber set a call acceptance has been initiated (in which case in the arrangement shown in FIG. 2 a special signal is applied at the input ta of the decoder C), are ready for receiving such a call address and respond to the reception of the address by providing a signal at the output c of the decoder D. The latter signal causes the setting of a bistable circuit FFA, the output signal of which closes a switch SchA. Over the break distance of the switch SchA, a connection is established between the section of the TDM trunk ZM coming in at the subscriber terminal under consideration and the input of the address modulator ModA, which has an output connected to the section of the TDM trunk going out from the subscriber station. The output signal of the bistable circuit FFA also activates an address generator which modulates, for the carrier byte coupled from the TDM trunk to the modulator ModA, upon the self-address of the subscriber terminal concerned. The self-address is then sent further together with the call address reduced by one bit. Finally, it returns to the terminal exchange, whereby the processing during the shortening of the addresses can be handled in accordance with the procedures described above for the reduction of the leading code word. There, the identification of the subscriber terminal requesting a connection triggers a number of processes necessary for the switching (this will be described later), whereupon the terminal exchange transmits the now known address of the subscriber station requesting a connection to the subscriber terminal itself. This is the only subscriber terminal capable of receiving the address. Following the reception of the address, the subscriber terminal switches to the activated state in which it is capable of receiving the communication data intended for it. Additionally, it sends the address of the subscriber requested by it to the terminal exchange which, due to the dial information, completes the call setup and sends to the called subscriber its own address as call address, which produces the subscriber call on that location.

Figure 7:
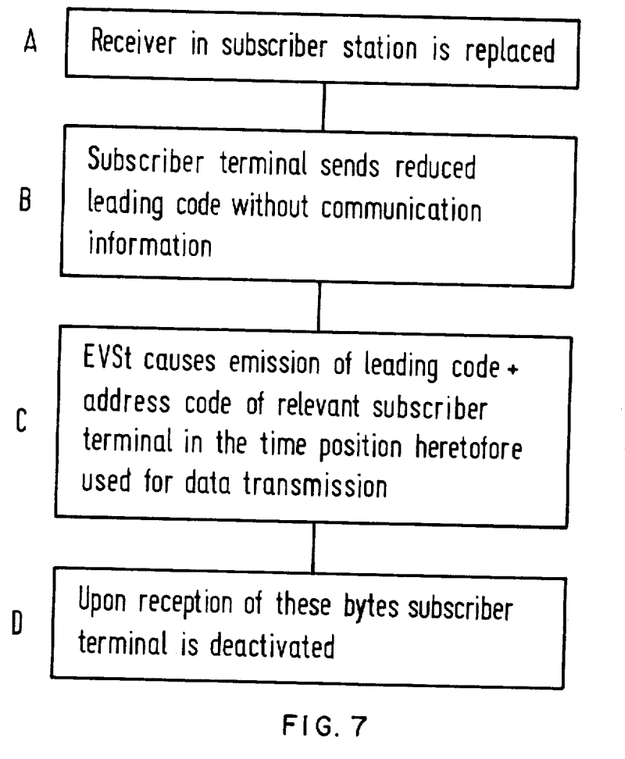
FIG. 7 is a flow diagram of the steps of the process leading to connection release.

The call can be released in such a manner that after the receiver in a subscriber station is replaced, the latter transfers only the reduced leading code word to the terminal exchange instead of the byte comprising the reduced leading code word and communication information. The terminal exchange thereupon causes the emission of a byte comprising the leading code word and address code word of the relevant subscriber terminal in the time sequence position heretofore utilized for the transmission of data to the subscriber terminal. The reception of the byte leads in a subscriber terminal in which the subscriber has replaced the receiver to deactivation. In this state total bytes comprising a leading code word, unmodulated carrier byte and bits modulated with communication data cannot be received again until a new connection is established.

Processes will now be described, with reference to FIG. 3, which are necessary for understanding the invention. These take place within the central terminal exchange in connection with a call setup and a call release.

Figure 3:
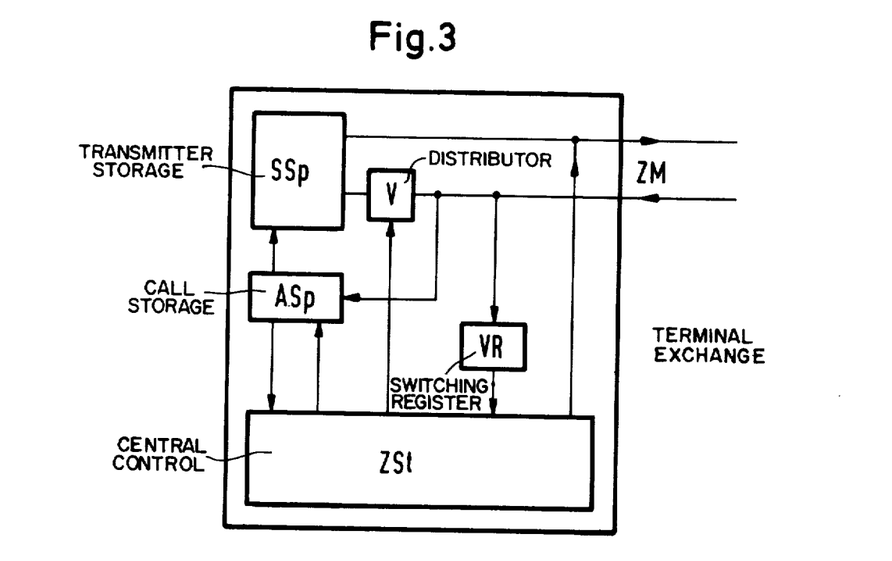
FIG. 3 is a schematic diagram of a terminal exchange in the FIG. 1 system for performing the method according to the invention.

Essential components of the terminal exchange shown schematically in FIG. 3 are a central control unit ZST and a transmitter storage SSp, both of which are of known construction.

In a row of prespecified storage locations in the transmitter storage SSp, the call addresses referenced above are stored with following carrier byte, read out at periodic intervals during corresponding time slots and are sent to the TDM trunk so as to initiate in the manner described above the call setup when there is a call request in one of the subscriber terminals. The unblocking code words discussed earlier are contained in other storage locations of the transmitter storage SSp. The readout frequency of the storage locations containing unblocking code words, or the spacing thereof, in the order of cyclic operations corresponds to the length of the particular sampling pulse frame appearing with the relevant type of message with which the subscriber terminals to be unblocked by the unblocking code word shall be supplied. Thus, while the unblocking code word for telephone subscriber terminals, whose sampling pulse frame shall, for example, be the longest, must in this case appear only once in the transmitter storage SSp, unblocking code words are available for unblocking, for example, video telephony subscriber terminals more than once at equidistantly spaced storage locations of the transmitter storage SSp.

The transmitter storage SSp also contains in the majority of its storage locations the aforementioned total bytes comprising leading code word, unmodulated carrier byte and byte modulated with communication data.

When there is a call request, that is, when a subscriber terminal has modulated the following unmodulated carrier byte with its own address due to the reception of a call address, this self-address travels over the TDM trunk ZM to a call storage ASp, which, due to the connection positions of heretofore activated subscriber terminals, determines in correspondence with the central control unit ZSt the disposition and category of the subscriber terminal requesting a call and causes an entry in a corresponding location of the send storage SSp.

First entered are only the appropriate leading code word and the group of unmodulated carrier bits. Where appropriate, the storage location corresponding to the connection position must first be cleared by shifting the existing storage entries in the send storage SSp. The earlier mentioned emission of the address of the subscriber terminal requesting a connection over the TDM trunk ZM takes place from the central control unit ZSt. The dial information sent back subsequently to the terminal exchange from the subscriber terminal, as explained above, is stored until it is fully available in the switching register VR. This then causes the central control unit ZSt to appropriately allocate the address of the calling substation to the address of the called subscriber terminal. Due to the allocation, communication data which arrive at the terminal exchange on the channel allocated to the called subscriber terminal are written into the location, allocated to the calling subscriber terminal, of the send storage SSp. This takes place, as shown in FIG. 3, via the distributor circuit V, over which the access to the send storage SSp from the TDM trunk takes place, and it is appropriately controlled by the central control unit ZSt. Thus, after completion of the call setup, the last-mentioned type of locations of the send storage SSp contain, aside from the leading code word and the group of unmodulated carrier bits, the communication data coming from the called subscriber terminal. As described earlier, the total byte is sent to the TDM trunk ZM during the time position corresponding to the connection position of the calling subscriber terminal.

One variation of the method according to the invention relating to the total bytes intended for the subscriber terminals will be briefly described. Whereas in the earlier described operational example within the total bytes the leading code word appears first, is followed by the group of unmodulated bits and thereafter by the communication data, in this variation the order of the group of unmodulated bits and the communication data is inverted. In this way, between the leading code word transferred by subscriber stations that have received a unit of communication information and the communication data supplied by the subscriber station there is a fairly large space corresponding to the group of carrier bits, which, coming into the subscriber station, have carried the communication data intended for it.

This criterion can be utilized in the following subscriber terminals, so as again to cancel out the blocking of the amplifier by the leading code word, so that the byte comprising leading code word and communication data passes through the subscriber terminals. Thus, it is pointless, as described above, to constitute the leading code word of a first part causing the temporary blocking and a second part fixing the blocking and not transmitted further.

Another variation of the method according to the invention is explained below with reference to FIG. 4. The subscriber terminals are connected to two parallel branches of a TDM trunk for this mode of operation. The branches are labelled ZMh and ZMr. At the start of each sampling pulse, all subscriber terminals involved in calls are blocked through the emission of a blocking code word by the terminal exchange EVSt, so as to prevent the free passage over the TDM branch ZMh.

The total byte which, according to this variation, is sent out by the terminal exchange in the course of an establised connection comprises a group of unmodulated carrier bits and the immediately following group of bits modulated with communication data. If such a total byte travels to the subscriber terminal activated first in the order of its connection, it is received by the processing section thereof so as to be modulated with the communication data to be transferred therefrom. The processes taking place in this connection are the same as in the operational example described hereinabove. Due to the dynamic storage allocation of the byte via a delay element, as has been described earlier, a criterion is obtained from the delayed end of the carrier group, by which the branch ZMh of the TDM trunk, so far as it runs through the subscriber terminal under consideration, is again unblocked. By this means, carrier bytes sent out subsequently by the terminal exchange can pass through the subscriber terminal and, where necessary, are amplified only at that location.

The above mentioned unblocking of the transit route through the subscriber terminal, or of the amplifier disposed in the transit route, results at the same time in the blocking of the processing section of the subscriber station against the reception of subsequent bytes within the same sampling pulse frame.

The transfer of the carrier byte of the subscriber terminal, now modulated with the communication data being supplied, occurs over another branch ZMr, over which the bytes pass without hindrance through the following subscriber terminal, and finally, can travel back to the terminal exchange EVSt. In the terminal exchange 1En shown in FIG. 4, the transition from one branch ZMh of the TDM trunk to its other branch ZMr is indicated by a connection shown in dotted line.

Figure 4:
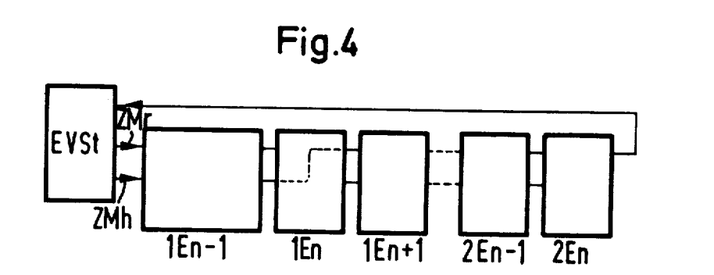
FIG. 4 is a block schematic diagram of another embodiment of the section of a PCM/TDM communication network used in conjunction with an alternate form of transmission of data by the terminal exchange.

The arrangement shown in FIG. 4 can also be operated in a manner such that the parallel branches of the TDM trunk are its section coming into the terminal exchange. That means that the emission of bytes occurs through the terminal exchange over the non-subdivided section of the TDM highway, in which case the subscriber terminal 1En+1 of the group of subscriber terminals identified by the subscript 1 is the first in the order of connection.

Otherwise, reception, processing and transfer of the communication data in the individual subscriber terminals occur in the same way as in the variation of the method according to the invention, wherein the subscriber terminals are connected to one TDM trunk branch only.

The variation of the method according to the invention which can be applied if only one type of communication data appears in the communication network, or at least over a section of the TDM trunks, has the advantage that in order to trigger the processes in the subscriber terminals, apart from the bytes that are absolutely necessary for the data transmission, viz. the unmodulated carrier byte and the byte with the communication data for the individual subscriber terminals, no control bits need be sent out from the terminal exchange.

In the examples of operation described hereinabove it has been assumed that all subscriber terminals are connected to a single TDM trunk going out from the terminal exchange and also ending therein. It goes without saying that the network configuration may be chosen such that several TDM trunks connected in this fashion are provided which are operated from the terminal exchange.

The principles of the method of the invention are described hereinabove by describing, as necessary, exemplary embodiments of apparatus for operating according to the invention and the operational steps of that apparatus. It is contemplated that the described apparatus can be modified or changed, as well as their operational steps, while remaining within the scope of the invention as defined by the appended claims.

I claim:

1. A method of operation for a digital communication network wherein subscriber terminals are connected in a predetermined order to at least one time division multiplex (TDM) trunk, said trunk having its ends connected to a central exchange, comprising the steps of:
   transmitting from said exchange on said TDM trunk communication data for predetermined ones of said subscriber terminals participating in a given call in the order of the connection of said predetermined subscriber terminals to said TDM trunk, all other subscriber terminals being blocked from receiving, but passing, said communication data,
   readying said participating subscriber terminals for receiving said communication data, while blocking subscriber terminals other than said participating subscriber terminals from receiving communication data,
   receiving in each said participating subscriber terminal, processing and transmitting further said communication data transmitted from said exchange, while blocking the others of said participating subscriber terminals from receiving a communication data transmitted from the aforementioned participating subscriber terminal and
   disabling said participating subscriber terminals from receiving further communication data transmitted from said exchange after performing said receiving, processing and transmitting step.

2. The method defined in claim 1 comprising the additional step of:
   sending an unblocking code word from said exchange at the beginning of each sampling pulse frame for preparing said participating subscriber stations for reception of communication data.

3. The method defined in claim 1 comprising the additional steps of:
   sending an unmodulated carrier byte from said exchange prior to transmitting said communication data and
   modulating said carrier byte with communication data supplied from said participating subscriber terminals.

4. The method defined in claim 3 wherein said transmitting step further comprises preceding said communication data with a leading code word containing data identifying the type of following communication data and accessing said participating subscriber terminals.

5. The method defined in claim 4 wherein said leading code word comprises first bits to which said participating subscriber terminals respond by blocking the communication data associated therewith, if that communication data is directed to said participating subscriber terminals and last bits having a binary value to which said participating subscriber terminals respond by either continuing to block said communication data or allowing same to pass to others of said subscriber terminals.

6. The method defined in claim 5 wherein each said subscriber terminal includes a data processing unit containing a modulator and storage and comprising the additional steps of:

coupling a said unmodulated carrier byte to said modulator and said storage, producing a clock pulse for use in demodulating received communication information and a clearing signal and responsive to said clearing signal, reopening the said subscriber terminal for passage of communication information therethrough and blocking the said subscriber terminal from receiving other communication information during the same sampling interval.

7. The method defined in claim 1 wherein said digital communication network uses pulse code modulation, and wherein said transmitting step comprises producing and sending bytes comprising a leading code word, a unit of communication data, and an unmodulated carrier byte, said leading code word identifying the type of communication data and containing bits for accessing said participating subscriber stations for reception of the communication data and unmodulated carrier byte, and comprising the additional step of:

diverting, responsive to said leading code word, the communication data and unmodulated carrier byte to processing units in said participating subscriber terminals.

8. The method defined in claim 7 comprising the additional steps of:

modulating said carrier byte in a data processing unit of a said participating subscriber terminal and sending said leading code word and the modulated carrier byte further along said TDM trunk toward said exchange.

9. The method defined in claim 1 wherein said TDM trunk comprises two parallel branches connecting said subscriber terminals, and wherein said communication information comprises bytes constituted by unmodulated carrier bits and communication data and comprising the additional steps of:

diverting, at the start of each sampling pulse interval, said bytes from one of said branches to said participating subscriber terminals, said subscriber terminals receiving said bytes in the order of their placement along said TDM trunk, processing said bytes in said participating subscriber terminals, which processing includes modulating said bytes with information to be communicated from said participating subscriber terminals, permitting succeeding bytes to pass through said participating subscriber terminals without diversion following said processing and sending said modulated bytes over said TDM trunk toward said exchange.

10. The method defined in claim 9 wherein said two branches are formed into one after connecting all subscriber terminals for the return path to said exchange.

11. The method defined in claim 9 wherein said two parallel branches form a return path to said exchange.

12. A method of operating a pulse code modulated, time division multiplex (PCM/TDM) communication network wherein subscriber terminals are connected in a predetermined order to at least one TDM trunk, said trunk having its ends connected to a central terminal exchange, comprising the steps of:

transmitting from said exchange a call address in at least one predetermined time sequence position for establishing a connection and transmitting thereafter an unmodulated carrier byte, requesting a connection by at least one of said subscriber terminals, modulating said carrier byte in said requesting subscriber terminal and removing data corresponding to said requesting subscriber terminal, from said call address, transferring the modulated carrier byte and reduced call address in a direction on said TDM trunk toward said exchange, sending, thereafter, from said exchange a byte comprising a leading code word and unmodulated carrier bits during the time position corresponding to the relative location of said requesting subscriber terminal and during several sampling intervals and modulating in said requesting subscriber station said carrier bits with dial digits corresponding to a subscriber terminal to be called.

* * * * *